INVENTORS.
EDWARD T. STRICKLAND
HOMER C. AMOS
BY Schroeder, Hofgren,
Brady & Wegner
ATTORNEYS INVENTORS.
EDWARD T. STRICKLAND
HOMER C. AMOS
BY Schroeder, Hofgren,
Brady & Wegner
ATTORNEYS Aug. 15, 1961 E. T. STRICKLAND ET AL 2,995,874
MACHINE TOOL
Filed Aug. 20, 1958 5 Sheets-Sheet 5
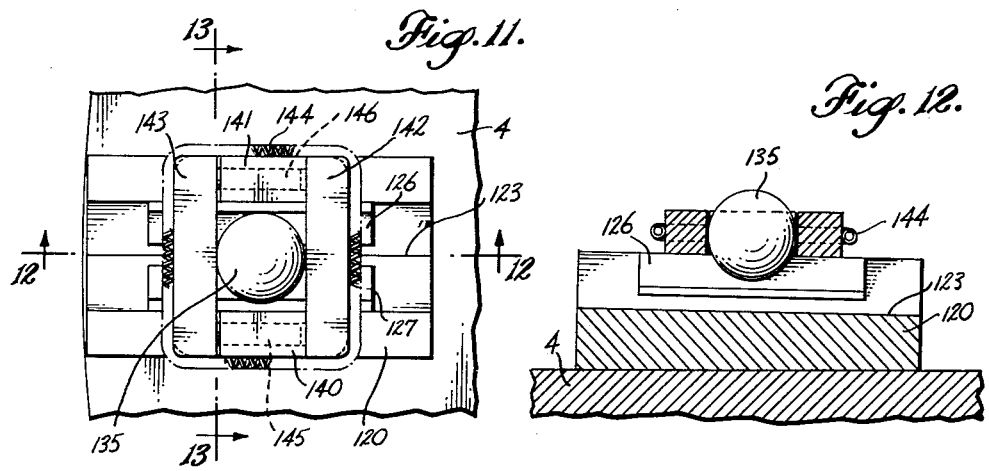
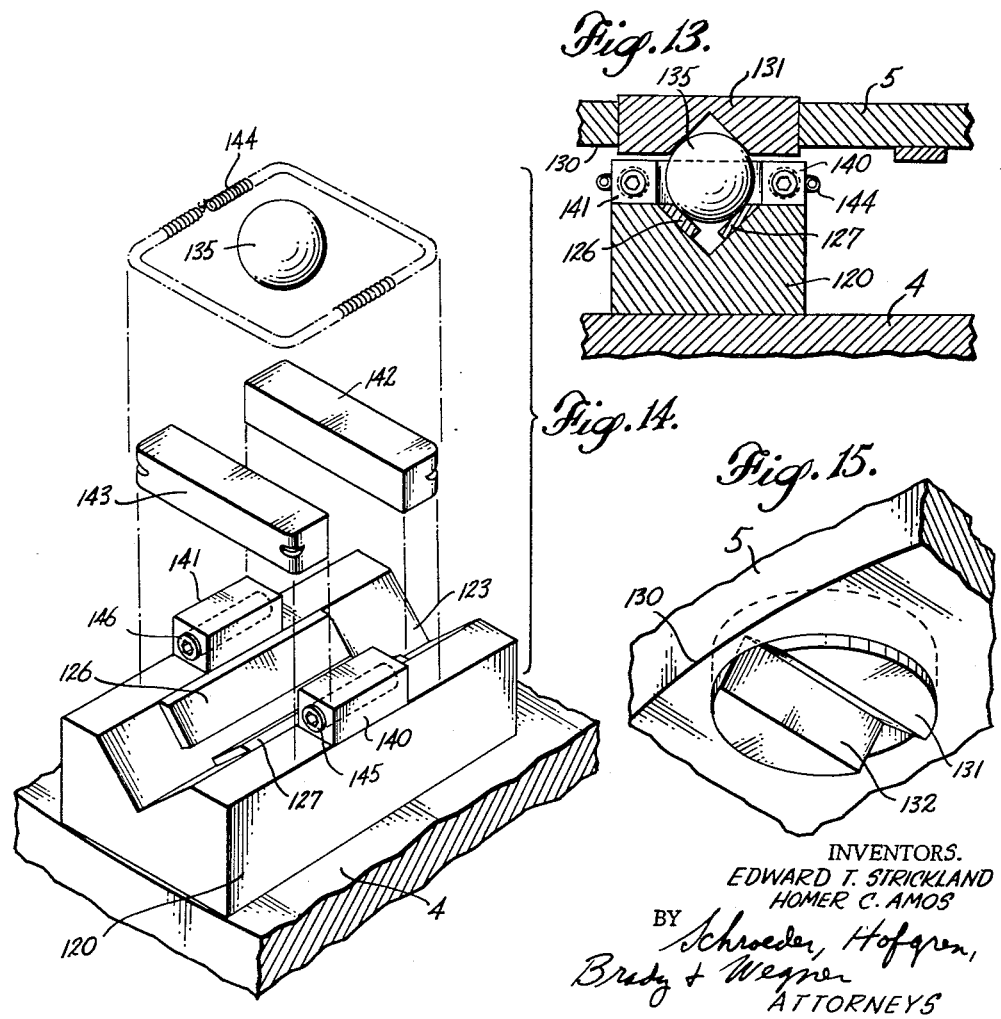
INVENTORS.
EDWARD T. STRICKLAND
HOMER C. AMOS
BY Schroeder, Hofgren,
Brady & Wegner
ATTORNEYS United States Patent Office 2,995,874
Patented Aug. 15, 1961

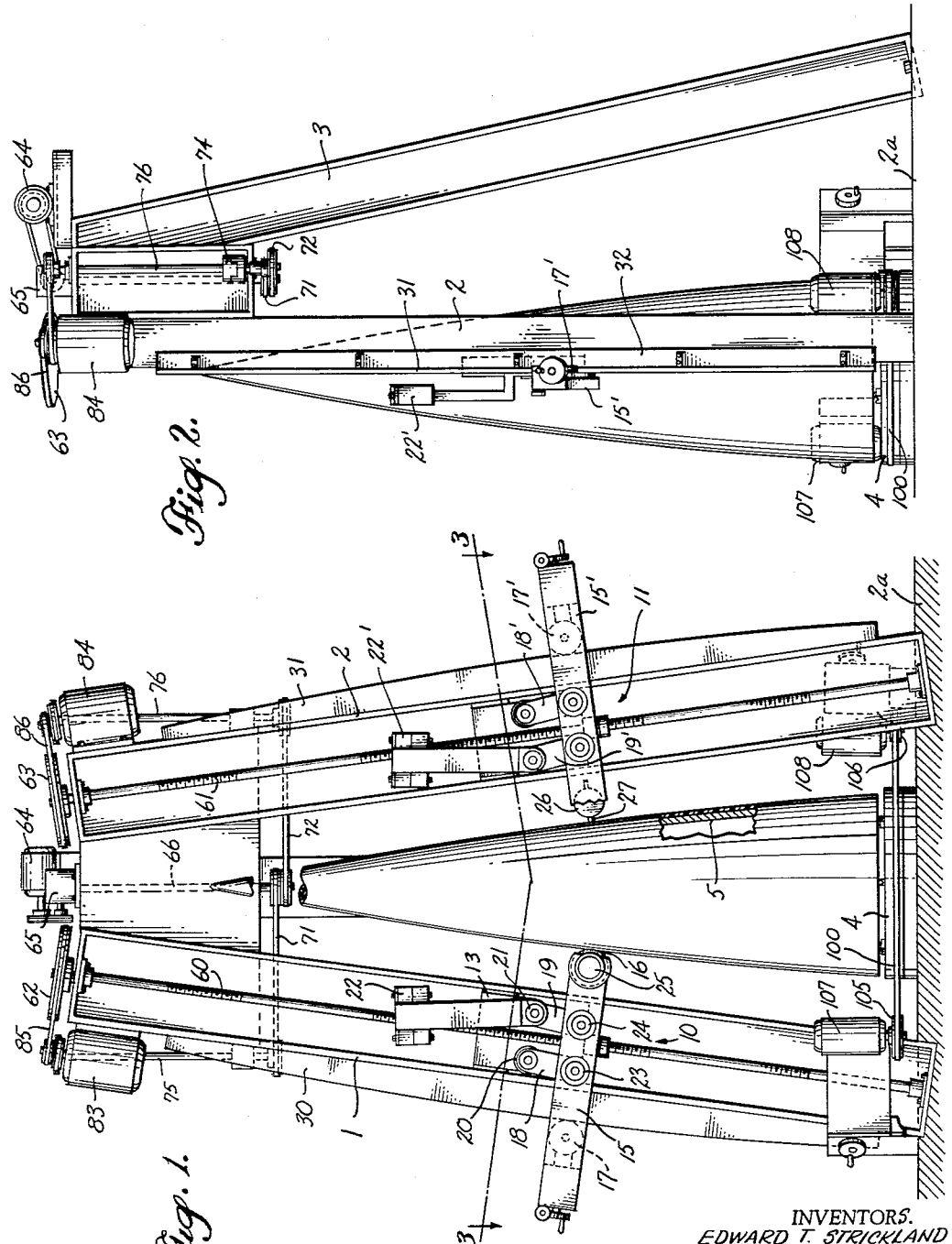

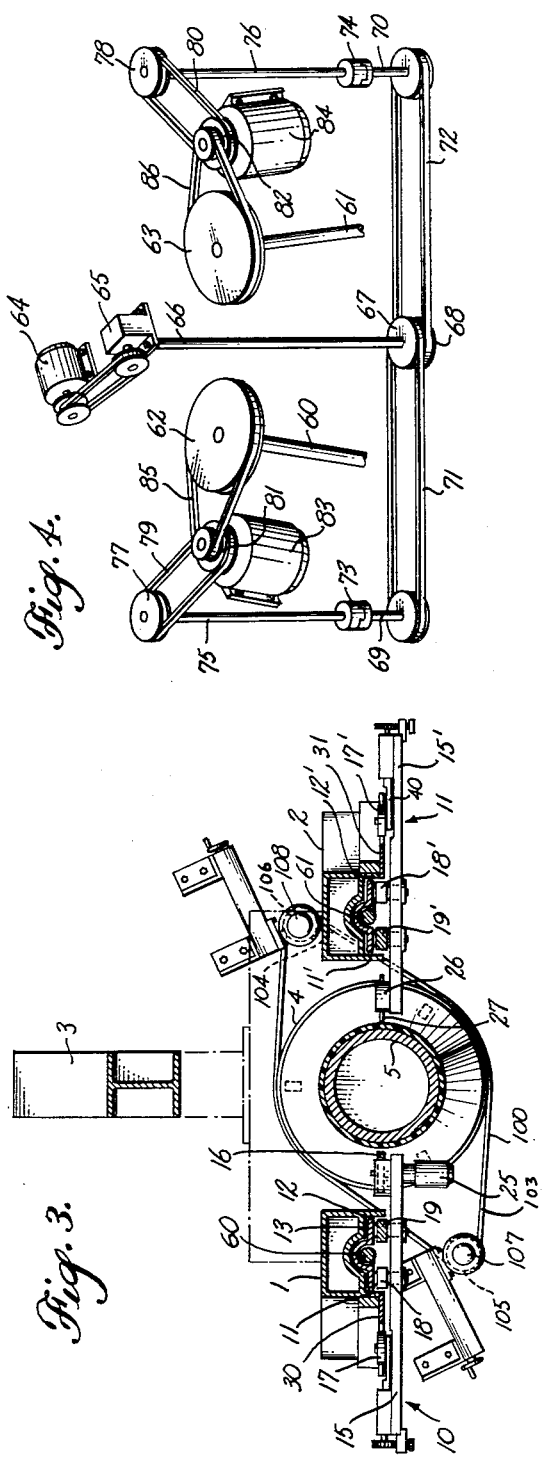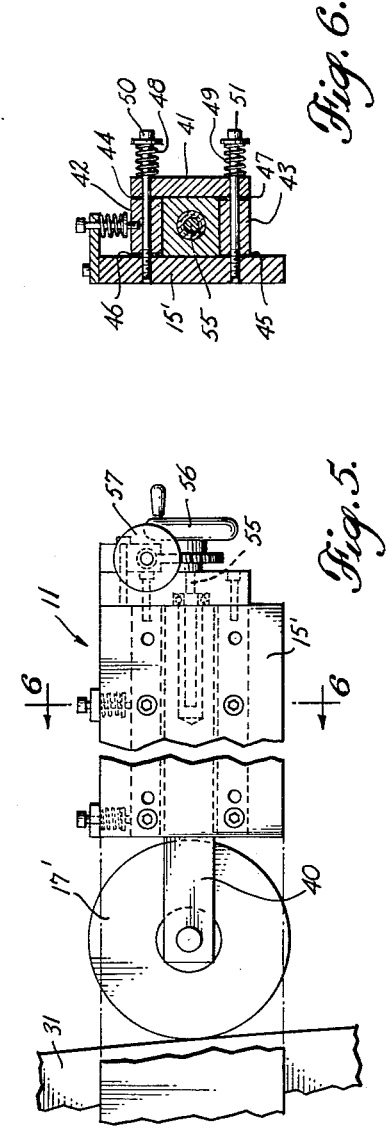

2,995,874
MACHINE TOOL
Edward T. Strickland and Homer C. Amos, Palm Springs, Calif., assignors to Brunswick Corporation, a corporation of Delaware
Filed Aug. 20, 1958, Ser. No. 756,189
11 Claims. (Cl. 51—50)

This invention relates to a machine tool and, more particularly, to a grinding and gauging machine.

An object of the invention is to provide a new and improved machine tool.

Another object of the invention is to provide a new and improved grinding and gauging machine for an article for forming the article with a wall thickness substantially uniform along the entire length thereof by mechanism including a frame having a pair of legs extending longitudinally along an article to be ground, each leg carrying a template with a profile edge, and a grinder assembly movable on one leg and a gauge assembly movable on the other leg coacting with said templates, whereby grinding and gauging of the article may be accomplished without relocating the article.

Other objects of the invention are to provide a grinding and gauging machine as defined in the preceding paragraph in which the gauge assembly and grinder assembly include mounting mechanism which may be adjusted within careful limits for accurate adjustment of the parts, mechanism by which the gauging of the article may be done simultaneously or independently of the location of the grinding wheel, a mounting for an article supporting mandrel to exactly locate the mandrel in the machine, and a drive mechanism for a floating turntable which avoids side loads on the turntable to contribute to the accuracy of the machine.

Further objects and advantages will become apparent from the following detailed description taken in connection with the accompanying drawings in which:

FIG. 1 is a front elevational view of the grinding and gauging machine with a part of an article broken away to show the supporting mandrel;

FIG. 2 is a side elevational view of the machine looking toward the right in FIG. 1;

FIG. 3 is a plan section taken generally along the line 3—3 in FIG. 1;

FIG. 4 is a fragmentary, diagrammatic view of the drive mechanism for the grinder assembly and gauge assembly;

FIG. 5 is a fragmentary elevational view on an enlarged scale with parts broken away of the structure for mounting a template follower;

FIG. 6 is a vertical section taken generally along the line 6—6 in FIG. 5;

FIG. 11 is a fragmentary plan view on an enlarged scale of a part of the mandrel mounting mechanism carried by the turntable;

FIG. 12 is a vertical section taken generally along the line 12—12 in FIG. 11;

FIG. 13 is a vertical section taken generally along the line 13—13 in FIG. 11, with the mandrel shown in association therewith;

FIG. 14 is an exploded view of the mandrel mounting mechanism shown in FIG. 11; and FIG. 15 is a fragmentary perspective view looking upwardly toward the underside of the mandrel to show a part of the locating mechanism carried thereby.

Figure 7:
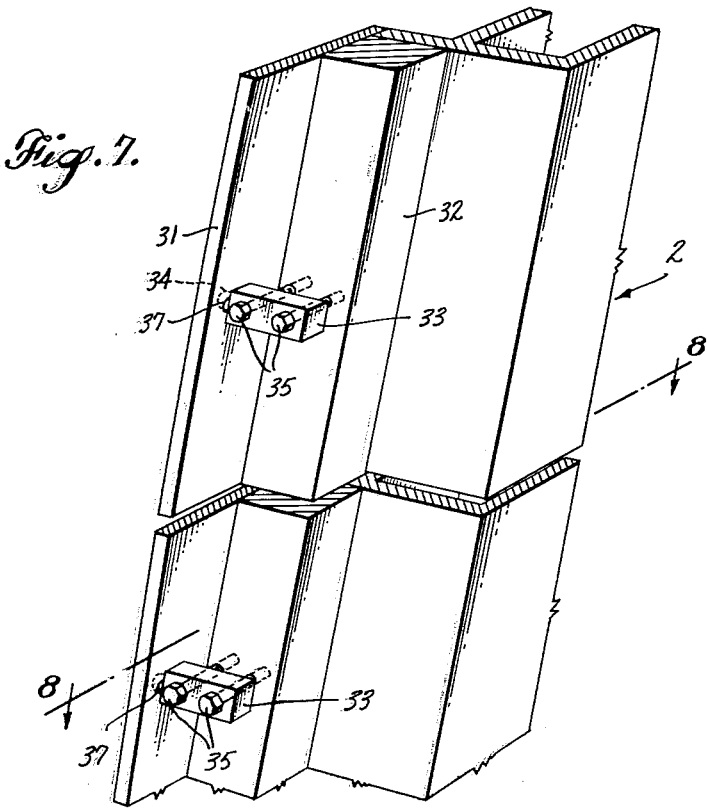
FIG. 7 is a fragmentary perspective view on an enlarged scale showing the mounting of a template to its support.

While this invention is susceptible of embodiments in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

As shown in the drawings, the machine comprises a framework provided with a pair of inclined legs 1 and 2 extending upwardly from a base or supporting surface 2a. The legs 1 and 2 are braced by a third angled rear leg 3 extending upwardly from the base and connected to the legs 1 and 2 near their top. Positioned between the legs 1 and 2 adjacent their lower end is a rotary turntable 4 on which a mandrel 5 is carried. The mandrel 5 is adapted to carry a hollow glass fiber form such as a radome, and the machine disclosed herein is designed to grind the cured form to provide a wall thickness for the radome in which the variation from top to bottom must be within .001".

The legs 1 and 2 have associated therewith a grinding assembly, indicated generally at 10, and a gauging assembly, indicated generally at 11, respectively. Each of these assemblies are generally the same in construction, and the assembly 10 will be described hereinafter in detail. Each of the legs 1 and 2 is provided with guideways 11 and 12 in which a slide or carriage 13 forming part of the assembly 10 is slidably mounted for movement lengthwise of the leg 1. A mounting arm 15 carries a grinding wheel 16 and a template follower 17 and is mounted for movement along a line generally normal to the surface of the part being ground by a pantograph arrangement in which parallel pantograph arms 18 and 19 are pivoted by precision bearings 20 and 21 to the slide 13. The lower ends of the pantographs arms 18 and 19 are pivotally connected to the mounting arm 15 by a pair of precision bearings 23 and 24. The entire assembly is counterweighted by a counterweight 22 and the parts are arranged to have the follower 17 have pressure engagement with its template. The grinding wheel 16 is driven by a motor 25 carried on the mounting arm 15.

Parts of the gauging assembly 11 corresponding to the grinding assembly 10 have been given a similar reference number with a prime affixed thereto. The mounting arm 15' of the gauge assembly 11 carries a gauge 26 having a movable stem 27 engageable with the surface of the article being ground with the movable stem operable to shift a pointer relative to the gauge dial to indicate any deviation from a zero setting of the gauge. The deviation indicates any necessary adjustment of the grinding wheel 16.

Extending along the legs 1 and 2 are a pair of templates 30 and 31 respectively, associated one with each of the legs. The template 30 has a profile edge with which profile follower 17 of the grinder assembly 10 is engageable, and the template 31 has a similar edge for engagement by the profile follower 17' of the gauge assembly 11. The profile edges of the two templates are identical to space the grinding wheel and gauge at the same distance from the axis of rotation of the turntable 4 at any common elevation of these members relative to the turntable.

Figure 8:
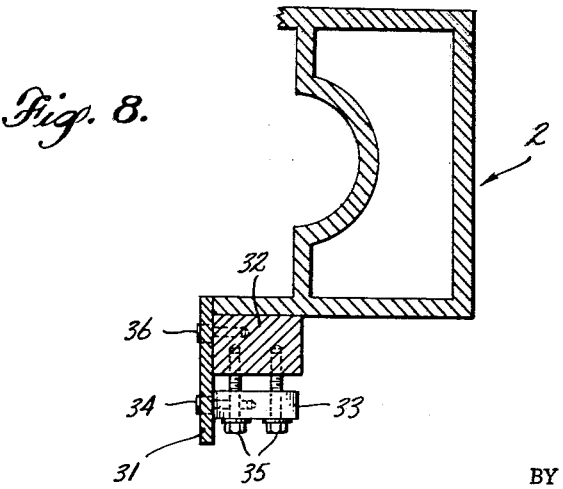
FIG. 8 is a horizontal sectional view taken along the line 8—8 in FIG. 7.

In order to compensate for any deflections of the relatively thin templates, each of the templates is mounted as shown in FIGS. 7 and 8, in which the mounting of the template 31 is shown. The leg 2 has a block 32 extending along the length thereof for association with a plurality of blocks 33 fixed to the template in spaced apart relation by bolts 34. Each of the template blocks 33 may be moved toward and away from the leg block 32 by a pair of adjustable bolts 35 threaded in the leg block. A headed bolt 36 threaded in the leg block is mounted in a slot 37 in the template and may be tightened to hold the template in fixed position after adjustment of its position by the bolts 35.

Each of the mounting arms 15 and 15' adjustably carries the associated template follower in a manner to provide close tolerances and intimate fit between the parts. Each of the profile followers is mounted similarly and the mounting of profile follower 17' is shown in FIGS. 5 and 6. The profile follower 17' is carried on a mounting bar 40 which is slidably mounted in an enclosure having four walls with the mounting arm 15' forming one wall. An opposite wall 41 is spaced from the mounting arm 15' and the third and fourth walls are in opposed relation and formed by members 42 and 43. The wall members 41 and 42 are bonded together by a thin layer of resin 44 such as an epoxy rosin, as are the mounting arm 15' and the member 43 by a thin layer 45. A pair of thicker layers of resin, such as an epoxy resin, are provided as shown at 46 and 47 between arm 15' and member 42 and members 43 and 41, respectively, whereby the four sides of the mounting bar enclosure are bonded together. As the mounting bar 40 moves relative to the enclosure, a slight wearing of the parts will be compensated for by springs 48 and 49 surrounding bolts 50 and 51 secured in the mounting arm 15' which exert force on the enclosure member 41 to maintain a slight amount of pressure on the resin bonds 46 and 47. The resin has a slight tendency to creep, and as this creeping occurs, the relatively light springs 48 and 49 take up the slack created between the enclosure members. The resin functions to prevent relative separation between the parts.

Relative movement between the mounting arm 15' and the profile follower 17' is accomplished by an adjusting screw 55 connected between the parts and operable by a handle 56 and a vernier adjustment 57 is provided for obtaining extremely accurate adjustment.

Means for moving the grinder assembly 10 and the gauge assembly 11 along the legs 1 and 2, respectively, includes a pair of lead screws 60 and 61, respectively, rotatably mounted on the legs and which are driven by a pair of pulleys 62 and 63 at the top of the machine. A first drive train for driving both lead screws simultaneously at the same rate includes a motor 64 connected to a gear reduction unit 65. The gear reduction unit 65 has an output shaft 66 carrying a pair of pulleys 67 and 68 which drive a pair of stub shafts 69 and 70 by means of belts 71 and 72, respectively. Each of the stub shafts 69 and 70 carry a component of a pair of magnetic clutches 73 and 74, and when these clutches are in engagement a pair of shafts 75 and 76 connected to the magnetic clutches are driven. The shafts 75 and 76 each have a pulley 77 and 78, respectively, connected by belts 79 and 80 to pulleys 81 and 82 on the output shafts of a pair of motors 83 and 84. With the motors 83 and 84 not operating, the drive continues to the lead screw pulleys 62 and 63 through belts 85 and 86, respectively, connected between the lead screw pulleys and a second pulley on each of the drive shafts of motors 83 and 84.

When it is desired to move either the grinder assembly 10 or the gauge assembly 11 independent of the other, the common drive from motor 64 is discontinued by deenergizing this motor and deenergization of the magnetic clutches 73 and 74. The motor 83 may then be energized to move the lead screw 60 to move the grinder assembly 10 along the leg 1 and the motor 84 may be energized to rotate the lead screw 61 to move the gauging assembly 11 along its supporting leg.

Figure 9:
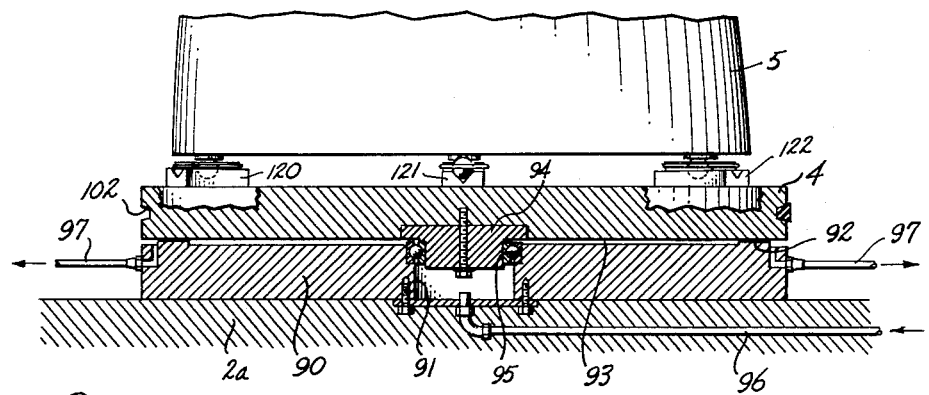
FIG. 9 is a vertical section of the turntable and its mounting and showing a mandrel supported thereon, and taken generally along the line 9—9 in FIG. 10.
Figure 10:
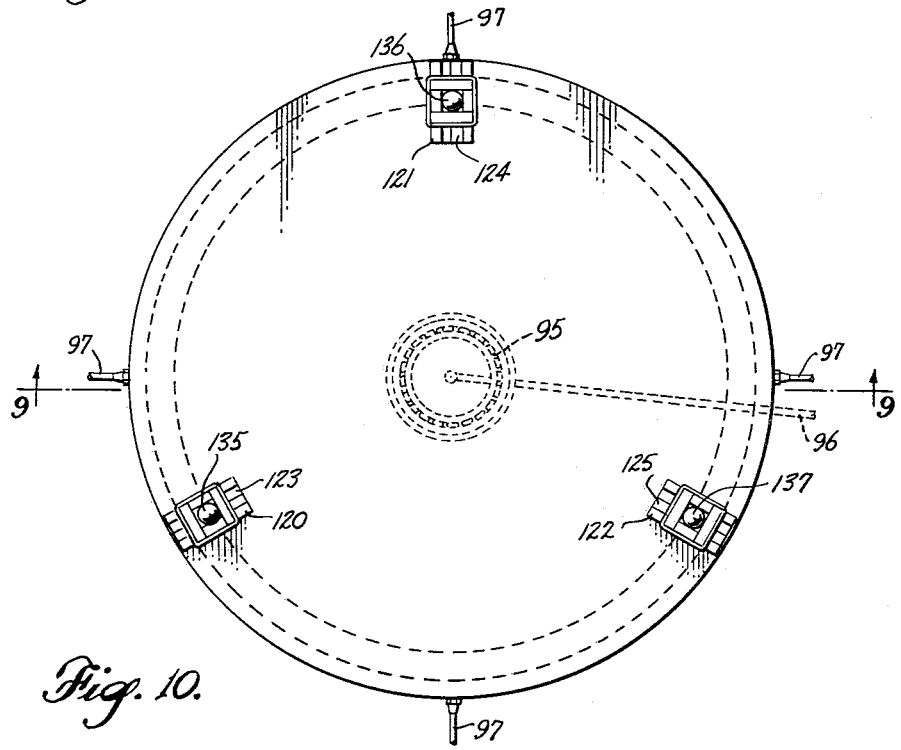
FIG. 10 is a plan view of the turntable with the mandrel removed therefrom.

As shown in FIGS. 9 and 10, the turntable 4 is rotatably mounted on a base member 90 suitably mounted on the supporting structure or base 2a of the machine for rotation through a fluid mounting. The base 90 has a central chamber 91 and an annular bearing face 92 adjacent its periphery with a depressed area 93 between the central chamber and the bearing face 92. The turntable has a generally flat lower face with a central mounting section 94 fitted within the central chamber 91 of the base with a precision type ball bearing 95 rotatably mounting the turntable. The bearing provides for lateral placement of the turntable 4 relative to the base 90. A fluid inlet line 96 leads to the central chamber whereby fluid may pass through the bearing 95 into the space between the turntable lower face and the depressed area of the base to form a fluid cylinder wherein a piston effect supports the substantial weight of the turntable and the mandrel supported thereon. The fluid then flows between the turntable lower face and the bearing face 92 to provide a thin film of fluid for maintaining the turntable in a fixed plane of rotation. The fluid then passes to collecting lines 97 which lead to a tank (not shown).

As a specific example, a controlled flow of kerosene at approximately one pint per hour at about 3 p.s.i. is fed into the central area 91.

With the turntable 4 delicately mounted on the base member 90, it is extremely desirable to avoid the application of side loads to the turntable. For this purpose a drive arrangement is provided wherein an endless belt 100, as shown in FIG. 3, engages a peripheral groove 102 in the turntable 4 at diametrically opposite locations and provides two loops 103 and 104 in the belt, each of which loops has a driven pulley 105 and 106 in driving relation with the belt. The pulley 105 is driven by a motor 107, while the pulley 106 is driven in the same direction as pulley 105 by a motor 108. These motors are mounted on vibration free mounts to avoid the transmission of vibrations, and the pulleys 105 and 106 are of the split type so as to equalize the forces applied by the motors 107 and 108. With this structure a "pure twist" is applied to the turntable 4 and the side load created by one motor is balanced by the other motor.

The turntable 4 is provided with precision locating means for the article supporting mandrel in the form of three equally spaced-apart blocks 120, 121 and 122 located in a circular disposition adjacent the periphery of the turntable 4. Each block has a V-shaped groove extending radially toward the center of the circular disposition with the base of the groove sloping slightly downward toward the center of the turntable. These grooves are indicated at 123, 124 and 125. Each of the grooves 123, 124 and 125 has a pair of wear plates 126 and 127 fitted therein.

The underside 130 of a mandrel 5 has three similar members in the form of blocks, one of which is shown at 131, equally spaced apart about the periphery of the mandrel and located to overlie the blocks 120, 121 and 122 of the turntable 4. These mandrel blocks each have a downwardly facing V-shaped groove 132 with the grooves extending radially of the center of the circular disposition of the mandrel blocks.

A plurality of balls 135, 136 and 137 are associated one with each of the pairs of turntable and mandrel blocks to lie therebetween and be fully seated in the block grooves to accurately locate the mandrel 130 on the turntable 4 and actually form a connection for causing the mandrel to rotate with the turntable. The coacting parts provide an exact location for mounting the mandrel on the axis of turntable rotation and compensate for slight contraction of the mandrel as the mandrel returns to room temperature after leaving an operation involving substantial heat.

In order to properly locate the mandrel, it is necessary that each of the balls 135, 136 and 137 assume its exact location between the turntable and mandrel blocks, this is facilitated by a spring trap associated with each of the turntable blocks 120, 121 and 122. This trap includes a pair of auxiliary side blocks 140 and 141 secured to the upper side of each of the turntable blocks. The structure associated with each of the turntable blocks is identical, and that associated with a single block will hereinafter be described. The auxiliary side blocks 140 and 141 are secured to the turntable block at opposite sides of the groove 123. A pair of end blocks 142 and 143 are provided at the ends of the side blocks. A surrounding coil spring 144 surrounds the end blocks 142 and 143 and, as shown in FIG. 11, holds the parts in assembled relation with the ball 135 captured between the end blocks 142 and 143 and the side blocks 140 and 141. In order to obtain accurate positioning of the end blocks 142 and 143, each of the side blocks has an adjusting screw 145 and 146 threadably mounted therein which may extend from both ends thereof to determine the position of the end blocks 142 and 143. The continuous adjusting screws 145 and 146 provide a constant spacing or distance between the end blocks 142 and 143 and the adjustment of the screws merely functions to shift this space relative to the side blocks 140 and 141.

When the mandrel is initially set on the turntable, the balls 135, 136 and 137 may shift somewhat out of their desired position and not be fully seated. It is necessary to return the balls to their fully seated position in order to have the upper end of the mandrel at its desired location relative to the grinding and gauging mechanism. By jacking up the mandrel a ball positioned at the jacked up side is free to return to its desired position under the urging of the spring 144 and the accurate position of the ball is determined by abutment of the end blocks 142 and 143 with the adjusting screws 145 and 146 carried by the side blocks 140 and 141.

We claim:

1. A grinding and gauging machine comprising, a base, a turntable rotatably supported on the base and adapted to support an elongated workpiece upstanding therefrom for rotation about an axis, an elongated frame supported on the base including a pair of legs extending upwardly from the base, guide ways on each of said legs extending generally in the same direction as the axis of turntable rotation, a pair of carriages mounted one in each of said guide ways for movement therealong, a pair of elongated templates mounted one on each leg and extending in the same direction as the guide ways, a pair of mounting arms, one of said mounting arms adapted to support a driven grinding element adjacent one end thereof and the other mounting arm adapted to support a gauge element, a pair of template followers associated one with each arm and remote from said one end, means mounting the arms on their carriages for floating movement with a line between an element and the associated template follower maintained in a generally normal relation to the guide ways, including with each carriage, a pair of spaced apart parallel arms of equal length pivotally mounted on the carriage and pivotally mounted to said mounting arm with a line between their pivot axes at each end thereof generally normal to the guide ways when the element is adjacent a workpiece surface, means for urging the followers into engagement with the templates, and means for moving the carriages along the guide ways to cause the template followers to traverse the templates to correspondingly position the elements.

2. A grinding machine as defined in claim 1 wherein means are provided for adjstably mounting each of the template followers to the mounting arms including, a mounting bar carrying the follower and extending parallel to the arm, an enclosure on the arm for slidably guiding the bar, and means connected between the arm and the bar for holding the bar in adjusted position relative to the arm, said enclosure including a side wall of the arm, opposed walls extending from said side wall between which the bar is positioned, and a fourth wall opposed to the arm side wall, a resin bond between the opposed walls and said side wall and fourth wall holding the enclosure together, and spring means exerting a small force in a direction to maintain pressure on the resin as the bar and enclosure walls wear to compensate for creep of the resin.

3. A grinding and gauging machine for an elongated radome comprising, in combination, an upstanding frame having a pair of elongated upwardly extending legs spaced from each other, a radome supporting turntable rotatably mounted between said legs to rotate the radome about an axis, a pair of elongated templates with identical profile edges supported one on each leg and extending lengthwise thereof, means defining guide ways extending lengthwise of each leg, a pair of carriages associated one with each leg and movably mounted on the associated guide ways for movement in a path along the legs, a pair of supports movably carried one on each carriage with one adapted to carry a grinding wheel and the other a gauge, a pair of template followers mounted one on each support for engagement with the adjacent template to control the distance of the supports from said axis as the carriages move in said path, means for urging said supports in a direction to cause the template followers to engage the templates, and means for moving said carriages along said paths.

4. A grinding machine comprising, a base, a turntable rotatably supported on the base and adapted to support a workpiece for rotation about an axis, an elongated frame member supported on the base and adapted to extend upwardly therefrom, guide ways on said frame extending generally in the same direction as the axis of turntable rotation, a carriage mounted in said guide ways for movement therealong between positions adjacent the turntable and remote therefrom, an elongated template mounted on said frame extending in the same direction as the guide ways, a grinder mounting arm adapted to support a driven grinding wheel adjacent one end thereof and a template follower remote from said one end, means mounting the grinder arm on the carriage for floating movement with a line between a grinding wheel and the template follower maintained in a generally normal relation to the guide ways, including, a pair of spaced apart parallel arms of equal length pivotally mounted on the carriage and pivotally mounted to said mounting arm with a line between their pivot axes at each end thereof generally normal to the guide ways when said one end of the mounting arm is adjacent the workpiece, means for urging the follower into engagement with the template, and means for moving the carriage along the guide ways to cause the template follower to traverse the template to correspondingly position the grinder wheel.

5. A grinding machine comprising, a base, means adapted to rotatably support a workpiece for rotation about an axis, an elongated frame supported on the base and adapted to extend upwardly therefrom, a carriage mounted on the frame for movement therealong between positions adjacent the turntable and remote therefrom, an elongated template mounted on said frame extending in the same direction as the frame, a mounting arm adapted to support a grinding element adjacent one end thereof and a template follower remote from said one end, means mounting the grinder arm on the carriage for floating movement with a line between a grinding wheel and the template follower maintained in a generally normal relation to the guide ways, including, a pair of spaced apart parallel arms pivotally mounted on the carriage and pivotally mounted to said mounting arm, means for urging the follower into engagement with the template, and means for moving the carriage along the guide ways to cause the template follower to traverse the template to correspondingly position a grinder wheel.

6. A machine comprising, in combination, an upstanding frame having a pair of elongated upwardly extending legs spaced from each other, a rotatable turntable positioned between said legs to rotate a workpiece supported thereon about an axis, means on each leg for supporting one of a pair of elongated templates with identical profile edges extending lengthwise thereof, a pair of carriages associated one with each leg and movably mounted thereon for movement in a path along the legs, a pair of supports movably carried one on each carriage with each adapted to carry a workpiece engaging element, a pair of template followers mounted one on each support for engagement with the adjacent template to control the distance of the supports from said axis as the carriages move in said path, means for urging said supports in a direction to cause the template followers to engage the templates, and means for moving said carriages along said paths.

7. In a machine for grinding and gauging an article, in combination, a base, means on the base for rotating a workpiece about an axis, a first carriage movably carrying a grinding wheel support adapted to carry a grinding wheel for movement toward and away from said axis, means mounting the first carriage for movement in a path generally lengthwise of said axis, a second carriage movably carrying a gauge support adapted to carry a gauge for movement toward and away from said axis, means mounting said second carriage for movement in a path generally lengthwise of said axis, a pair of elongated template profile edges associated one with each of said carriages and extending generally along the path of carriage travel, a pair of template followers associated one with each carriage for following the associated template profile edge to control the distance of the grinding wheel and gauge from said axis, and means for moving said carriages either simultaneously in fixed relation to each other, or individually, in their paths to enable gauging of any part of an article independently of the location of the grinding wheel.

8. In a grinding and gauging machine as defined in claim 7, wherein the means for moving the carriages either in fixed relation to each other, or independently, comprises, a pair of rotatable lead screws associated one with each of said carriages for moving the associated carriage in response to rotation thereof, a first drive motor, a disengageable drive train between said first drive motor and the pair of lead screws for rotating the lead screws at the same rate, and second and third drive motors associated one with each of the lead screws to rotate said lead screws independently when said drive train is disengaged.

9. In a machine for grinding and gauging an article, in combination, a base, means for supporting a workpiece relative to an axis, a first carriage adapted to carry a grinding member for movement toward and away from said axis, means mounting the first carriage for movement in a path generally lengthwise of said axis, a second carriage adapted to carry a gauge for movement toward and away from said axis, means mounting said second carriage for movement in a path generally lengthwise of said axis, a pair of elongated template profile edges associated one with each of said carriages and extending generally along the path of carriage travel, a template follower associated with each carriage for following the associated template profile edge, and means for moving said carriages either simultaneously in fixed relation to each other, or individually, in their paths to enable gauging of any part of an article independently of the location of the grinding member.

10. In a grinding and gauging machine as defined in claim 9, wherein the means for moving the carriages either in fixed relation to each other or independently includes, a pair of translatable elements associated one with each of said carriages for moving the associated carriage, a first drive motor, a disengageable drive train between said first drive motor and the pair of translatable elements for moving the elements at the same rate, and second and third drive motors associated one with each of the translatable elements to move the elements independently when said drive train is disengaged.

11. A grinding machine comprising, means for adjustably mounting a template follower to a mounting arm including, a mounting member carrying the follower and extending along parallel to the arm, an enclosure on the arm for slidably guiding the mounting member, and means connected between the arm and the member for holding the member in adjusted position relative to the arm, said enclosure including a side wall of the arm, opposed walls extending from said side wall between which the member is positioned, and a fourth wall opposed to the arm side wall, a resin bond between the opposed walls and said side wall and fourth wall holding the enclosure together, and spring means exerting a small force in a direction to maintain pressure on the resin as the member and enclosure walls wear to compensate for creep of the resin.

References Cited in the file of this patent
UNITED STATES PATENTS

| | | |
|---|---|---|
| 1,740,006 | Crowley | Dec. 17, 1929 |
| 1,868,275 | Crowley | July 19, 1932 |
| 2,432,161 | Johnston | Dec. 9, 1947 |
| 2,472,902 | Johnston | June 14, 1949 |
| 2,824,413 | Whitehill | Feb. 25, 1958 |